United States Patent [19]

Ehrat

[11] 4,139,779

[45] Feb. 13, 1979

[54] METHOD OF ASSESSING A PRINTED ARTICLE

[75] Inventor: Kurt Ehrat, Steinmaur, Switzerland

[73] Assignee: Gretag Aktiengesellschaft, Regensdorf, Switzerland

[21] Appl. No.: 790,656

[22] Filed: Apr. 25, 1977

[30] Foreign Application Priority Data

Apr. 30, 1976 [CH] Switzerland .......................... 5451/76

[51] Int. Cl.$^2$ ................................................ G06K 5/00

[52] U.S. Cl. ........................................ 250/556; 356/71

[58] Field of Search ................. 356/71, 201, 204, 205, 356/206, 209, 212; 340/146.3 MA, 146.35, 146.3 AC; 250/555, 556, 566, 567

[56] References Cited

U.S. PATENT DOCUMENTS

| | | | |
|---|---|---|---|
| 3,267,439 | 8/1966 | Bonner | 340/146.3 S |
| 3,275,985 | 9/1966 | Dunn et al. | 340/146.3 S |
| 3,341,814 | 9/1967 | Chow | 340/146.3 S |
| 3,927,309 | 12/1975 | Fujiwara et al. | 340/146.3 S |

*Primary Examiner*—David C. Nelms

*Attorney, Agent, or Firm*—Burns, Doane, Swecker & Mathis

[57] ABSTRACT

A method is provided for automatically assessing a printed article, in particular a bank-note. The sample to be assessed is compared point by point with an original and differential values are thereby formed between the reflectance values obtained by photoelectrical scanning from the individual image points of the sample and the reflectance values of the image points of the original corresponding to the sample image points. The differential values of each image point are added, in the correct sign, with predetermined weighting, to the differential values of the image points adjacent thereto, and the sample is assessed as faulty if the absolute amount of the added differential values exceeds a predetermined threshold value at least in one image point.

19 Claims, 8 Drawing Figures

METHOD OF ASSESSING A PRINTED ARTICLE

Figure 1:
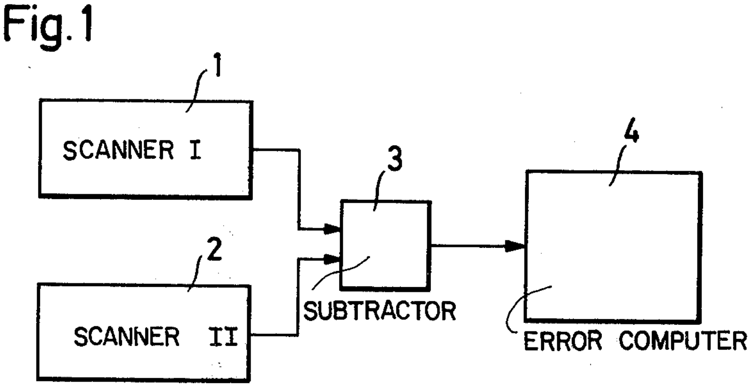

The invention relates to a process for assessing a printed article, in particular a bank-note, by means of a point by point comparison of the specimen to be assessed with an original, to form the differential values between the reflectance values of the individual image points of the specimen, which are preferably obtained by photoelectric scanning, and the reflectance values of the image points of the original, which correspond to the image points of the specimen.

The mechanical testing of the printing quality of bank-notes requires particular criteria and methods of assessing the number of differential values, obtained during the point by point comparison, of the scanning values of the image points on the original and on the specimen which correspond to one another. The simple criteria that a specimen is only to be adjudged as faultless or good if all, or at least a specific number, of the differential values are zero, is quite useless in actual practice. Rather is it necessary to include the nature of the differential values, their accumulation, size, position on the surface of the bank-note etc. in the assessment, and only on the basis of this assessment may the error decision "good" or "bad" be made. It is also necessary to distinguish whether individual error points, which can have their origin in, for example, minor irregularities in the printing or the paper, occur sporadically over the surface of the bank-note or lie closer together. As visual inspection of bank-notes has shown in practice, the human eye does not perceive these error points as printing errors in the first case, but does so very markedly in the second. The decision in the mechanical assessment of quality must also be corresponding.

It is the task of the present invention to provide a method of assessment which makes it possible to take into account all the above factors and thus to provide the prerequisite for the mechanical quality control of bank-notes and the like.

According to the invention, this task is accomplished by adding the differential values of each image point, with given weighting, to the differential values of the image points adjacent thereto in the correct sign, and assessing the specimen as faulty if in at least one image point the absolute amount of the addded differential values exceeds a given threshold value. According to a preferred embodiment, the procedure is that, before the weighted addition of the differential values, an average value is formed from the differential values in the individual image points, preferably by arithmetical averaging, that this average value is substracted from the individual differential values, and that only then are the differential values, diminished by the average value, added with weighting. A further advantageous embodiment comprises comparing the differential values, which may or may not be diminished by the average value, with a minimum threshold value before the weighted addition, and not taking into account those differential values whose absolute values are lower than the minimum threshold value in the subsequent weighted addition.

The invention is illustrated in more detail by the following drawing.

FIG. 1 shows a block diagram of a suitable device for carrying out the process of the invention;

FIGS. 2*a*–5*c* show diagrams for explaining the method;

FIGS. 6*a*–*f* show a number of different fault hill models; and

Figure 7:
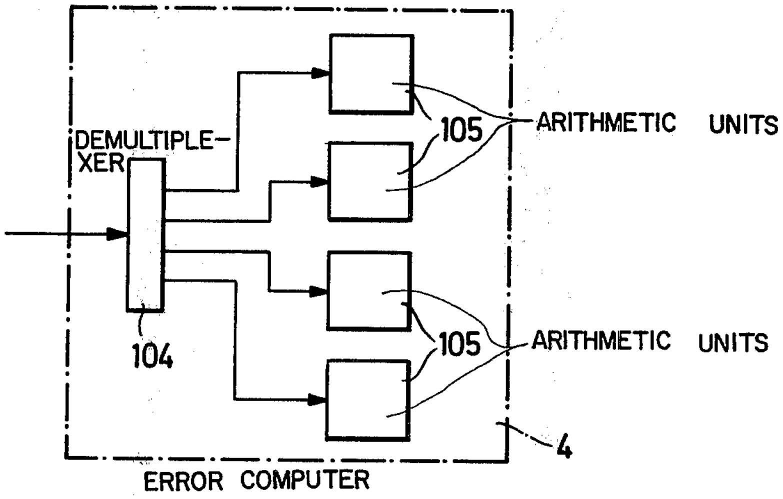
Figure 2:
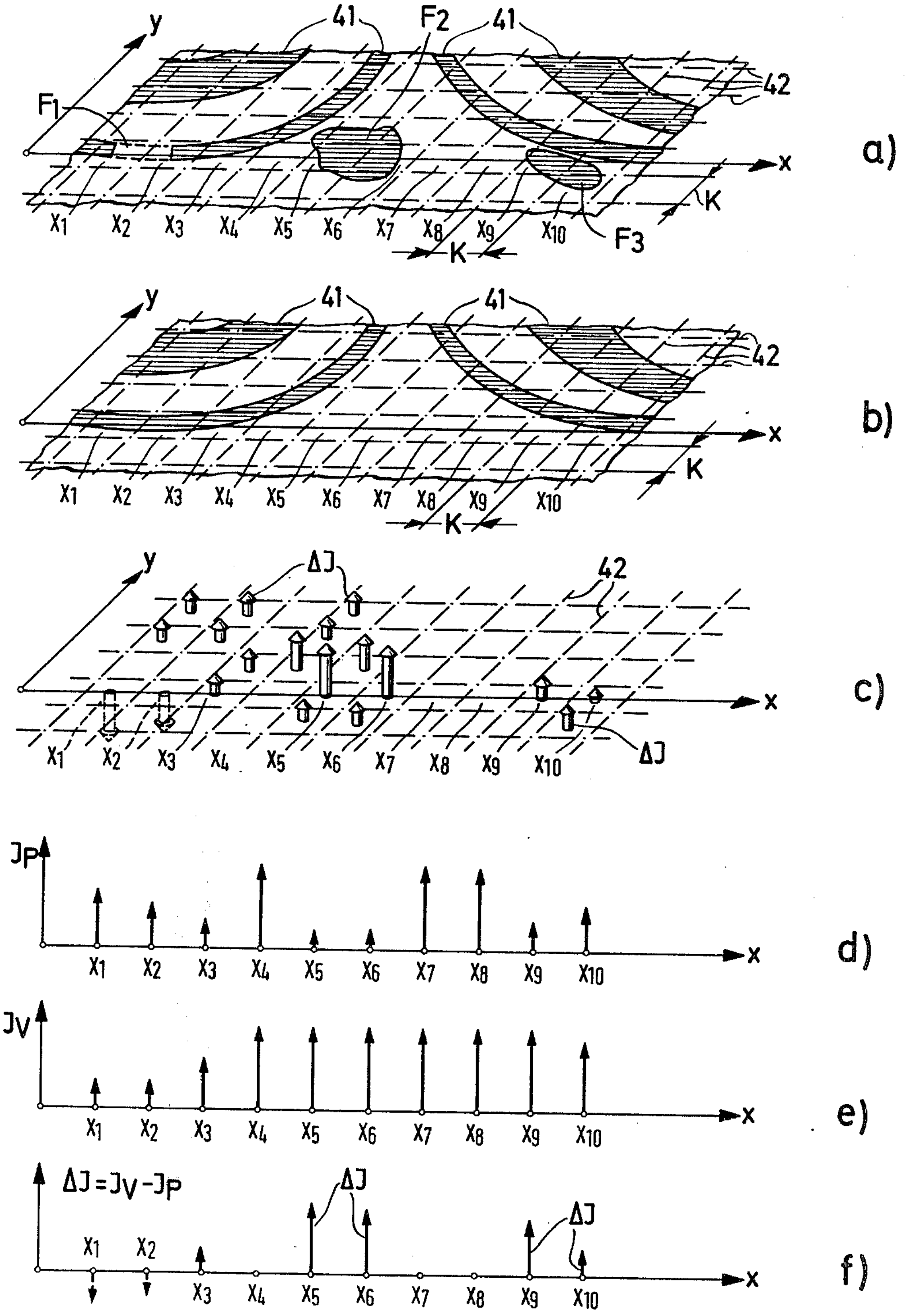
Figure 3:
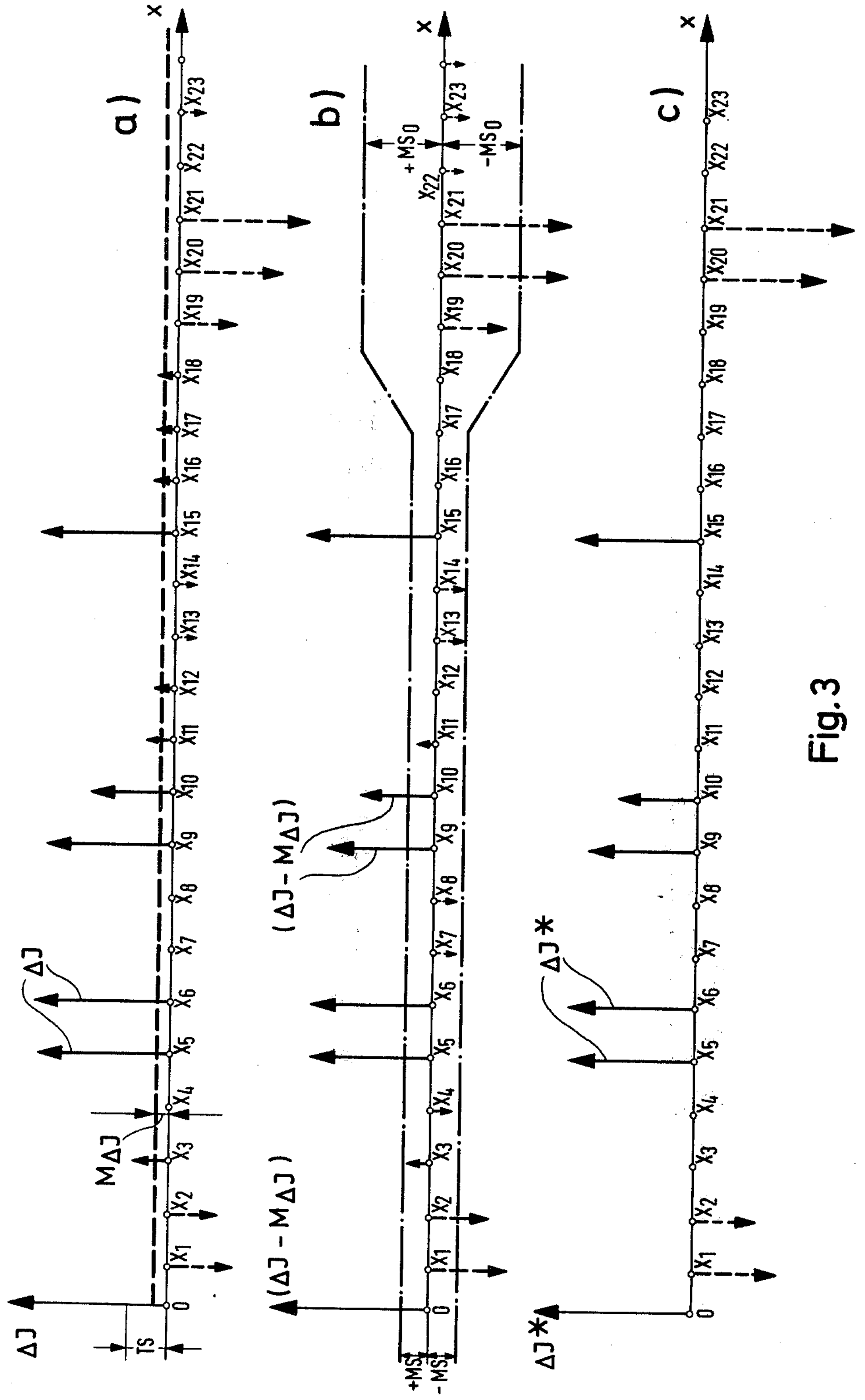
Figure 8:
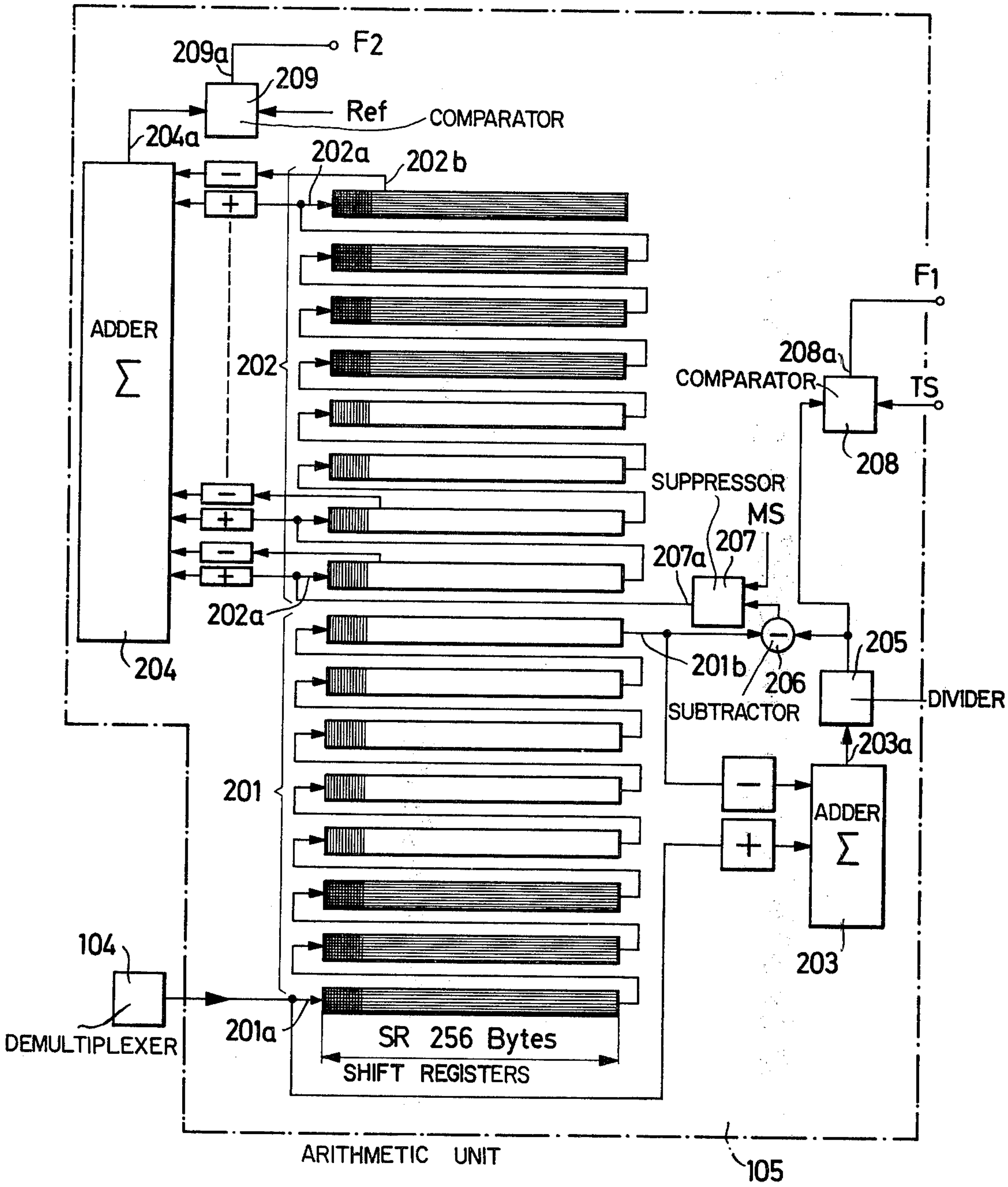

FIGS. 7 and 8 show a block diagram of a detail of FIG. 1.

The device illustrated in FIG. 1 consists of 4 operational blocks, viz. two scanning devices 1 and 2, a comparison and subtracting stage 3, and an error computer 4.

The specimen bank-note and the corresponding original bank-note are scanned point by point, in a manner known per se, image point by image point, in the two scanning devices 1 and 2. The scanning values thereby obtained of the image points corresponding to one another on the original and the specimen are fed to the comparison stage 3 and there subtracted from one another on each occasion. The differential values so obtained, assigned to one original and one specimen image point respectively, are then assessed in the error computer 4, in the manner yet to be described, to form the error decision.

The scanning devices 1 and 2 can be of any construction. An example of such scanning devices is described in DOS No. 2,207,800. However, one of the most essential requirements which the scanning devices must satisfy is that they ensure the determination of scanning values of actually corresponding image points on original and specimen. Scanning devices which are most particularly suitable for the present purpose are described in U.S. patent application Ser. Nos. 790,606 of Apr. 25, 1977 and 791,140 of Apr. 26, 1977, (corresponding to Swiss patent application Nos. 5449/76 and 5450/76 respectively). The scanning can be effected in "black and white" or in "colour", viz. in the three basic colours.

The error compouter 4 is any suitably programmed process control computer or mini-computer or can be hardware as illustrated in FIGS. 7 and 8.

FIGS. 2*a* and 2*b* each show an enlarged-scale detail of a sample bank-note face and an original bank-note face. It will be apparent that the sample clearly deviates from the original at three points having the references $F_1$ to $F_3$. The chain-dotted lines 41 and 42 extending parallel to the coordinate axes X and Y indicate the scanning raster with the raster distance K. Each two pairs of lines at right angles to one another define an image "point." Each image point thus has the area $K \times K$. The image points need not necessarily be square, of course, but may be circular for example. Overlapping image points are also possible.

FIGS. 2*d* and 2*e* show the reflectance values $I_P$ and $I_V$ determined on scanning the sample and original along the coordinate axis K at the image points $X_1 \ldots X_{10}$, in the form of arrows of varying length, FIG. 2*d* relating to the sample and FIG. 2*e* the original. FIG. 2*f* shows the differential values ΔI of the reflectances in the corresponding original and sample points $X_1 \ldots X_{10}$. Positive differential values $\Delta I = I_V - I_P$ are denoted by upwardly directed arrows while negative values are denoted by downwardly directed arrows. The absolute amounts of the differential values are symbolised by the length of the arrows.

FIG. 2*c* is a similar diagram to FIG. 2*f* showing the differential values ΔI for the individual image points of the bank-note details shown in FIGS. 2*a* and 2*b*. Each image point has a differential value ΔI associated with it. The total of all the differential values for the entire bank-note surface is designated hereinafter as the differential field. The individual values ΔI of the differential field are in actual fact stored in a suitable electronic store, e.g. a random access write-in store (RAM), in the error computer 22, in such manner that the position of the image points associated with said values is also maintained on the bank-note face. The three-dimensional representation of the differential values associated with the individual image points of the bank-note surface is intended only for the sake of clarity.

FIG. 3*a* shows a line of the differential field parallel to the X-axis similarly in FIG. 2*f*. The line contains the image points $X_1 \ldots X_{23}$ with the respective associated differential values ΔI.

The first step in evaluation, the differential values lies in a shade correction. To this end, the arithmetic mean $M_I$ of the differential values is formed for each image point at the image points of a given surrounding zone and the image point concerned is deducted from the differential value. The surrounding zone may, for example, be of a size of 0.5% to 10% of the total bank-note area. Preferably, the area of the surrounding zone is about 2% to 5%. It has been possible to obtain good results, for example, with surrounding zones of 20 × 20 $mm^2$ in the case of a bank-note of an area of about 100 × 200 $mm^2$. It would be possible — although somewhat less favourable — to select the surrounding zone to coincide for all the image points, i.e., so that it is equal to the total bank-note area. Another possibility of shade correction would be to divide the bank-note area into shade correction zones, find the mean of the differential values from each shade correction zone, and subtract those mean values from the differential values originating in each case from image points situated within such a zone.

The object of the shade correction is, in particular, to eliminate small and medium shade deviations between the sample and the original, for those acceptable shade deviations might disturb further evaluation of the differential values. The shade corrections also creates the conditions for an advance error decision. As will be seen from FIG. 3*a*, a shade threshold TS is predetermined for the or each mean value. If one of the mean values exceeds this threshold TS, the sample is assessed as defective. If the shade threshold is exceeded it simply means that unacceptably intensive shade differences exist between the sample and the original in respect of density or colour. The magnitude of the shade threshold TS naturally depends on what is considered acceptable and what is considered unacceptable.

After the shade correction, a minimum threshold correction is carried out in which all the (shade-corrected) differential values whose absolute values are below a predetermined minimum threshold MS are eliminated or made zero so that they are disregarded in the further evaluation.

FIG. 3*b* shows the shade-corrected differential values $\Delta I - M_{\Delta I}$ at the text points $X_1 \ldots X_{23}$. Two minimum thresholds ±MS and $\pm MS_O$ are also shown. FIG. 3*c* shows the result of the minimum threshold correction. Only those differential values $I^* = I - M_I$ whose absolute value is greater than that of the minimum thresholds MS and $MS_O$ now remain.

The object of eliminating small differential values is to avoid the small differential values interfering with the further evaluation in respect of the determination of small-area errors. Differential values below the minimum threshold MS are not necessary for this purpose. If a small-area error of large contrast (usually equal to about 1 density unit in printed products) and having the area $F_F$ is just to be detected, then the error sensitivity must be $F_F/F_m$, where $F_m$ denotes the area of a text point (K × K). If $F_F/F_m$ is, for example, 10%, a high-contrast small error which is just to be detected given a percentage reflectance variation of $I_F/I_{max} = 10\%$ in the image point, where $I_F$ denotes the reflectance different value as a result of the error and $I_{max}$ the maximum reflectance value of the image point. The required sensitivity of the complete differential value evalution can thus be adjusted by suitable dimensioning of the minimum threshold MS, i.e. in accordance with $MS/I_{max} = F_F/F_m$. Faults or errors giving a smaller relative reflectance variation than $I_F/I_{max} = MS/I_{max}$ then remain disregarded. The minimum threshold MS need not be constant for the total sample area or the total differential field. On the contrary, its size may vary independence on location. The differences between the sample and the original may be much greater at certain known places on the bank-note, e.g. in the case of the watermark, the position of which has been found to be very inaccurate by experience, than in the other zones of the face. If these greater differences are regarded as acceptable, no fault or error must be indicated in such cases. This can conveniently be achieved by making the minimum threshold higher for those portions of the face than for the other portions. FIG. 3*b* shows a local higher minimum threshold of this kind having the reference $MS_O$. It has been found in practice that it is satisfactory to make the mixture threshold MS substantially equal to the shade threshold MS, apart from local exceptions. Of course the minimum threshold MS and the shade threshold TS may be selected to be the same or different for each colour if colour scanning is carried out.

After the shade correction and minimum threshold correction there only remain differential values ΔI* of a certain minimum size in the differential field (FIG. 3*c*). If the fault or error decision were made only according to whether anyone of these differential values ΔI* exceeds a given amount, such decision would be false. A single small fault dot of medium contrast, for example, must not be assessed as a fault or error although an accumulation of a number of such dots situated more or less close to one another should be so assessed, because such accumulations appear to the human eye as a fault or error. It has been found in practice that the eye usually perceives a fault or error when the products of density variation D due to a disturbance and area $F_F$ of a more or less coherent disturbance is greater than 0.1 $mm^2$. High-contrast disturbance (D = 1) are thus perceived as an error or fault even when small in size (as from 0.1 $mm^2$). The geometric shape of the disturbance or fault or error plays only a secondary part in such cases. These empirical facts must be taken into account during the further evaluation.

To this end, according to another important aspect of the invention the differential values of each image point (such as still remain after the tone and minimum threshold correction) are added with predetermined weighting and with the correct sign to the differential values of the adjacent image points. Figuratively speaking, "fault hills" having the height of the differential value in each case are allocated to the individual differential values and then the individual fault hills are superimposed to form a "fault mountain" extending over the entire differential field.

Figure 6:
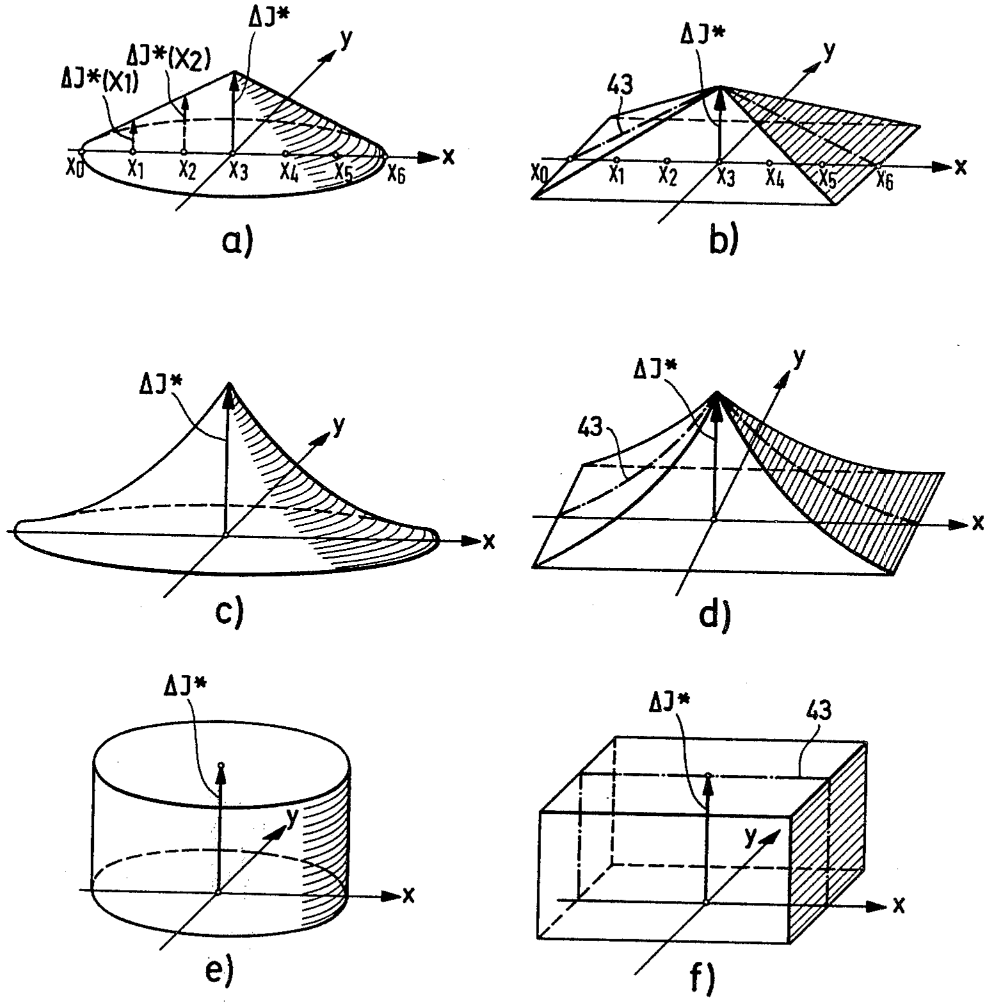

FIG. 6*a* shows an example of the fault hill of this kind, which is conical and its height is equal to the (corrected) differential value $\Delta I^*$ of the image point $X_3$. The diameter of its base is six times the distance between two image points. The surface area of the fault hill indicates the weight with which the differential value $\Delta I^*$ of the image point $X_3$ is added to the differential values of its surrounding points (e.g. $X_0$, $X_1$, $X_2$, $X_4$, $X_5$, $X_6$). The size of the base area determines the breadth effect. The fault hill is therefore simply a three-dimensional representation of a weight function dependent upon the two coordinates X and Y.

Figure 4:
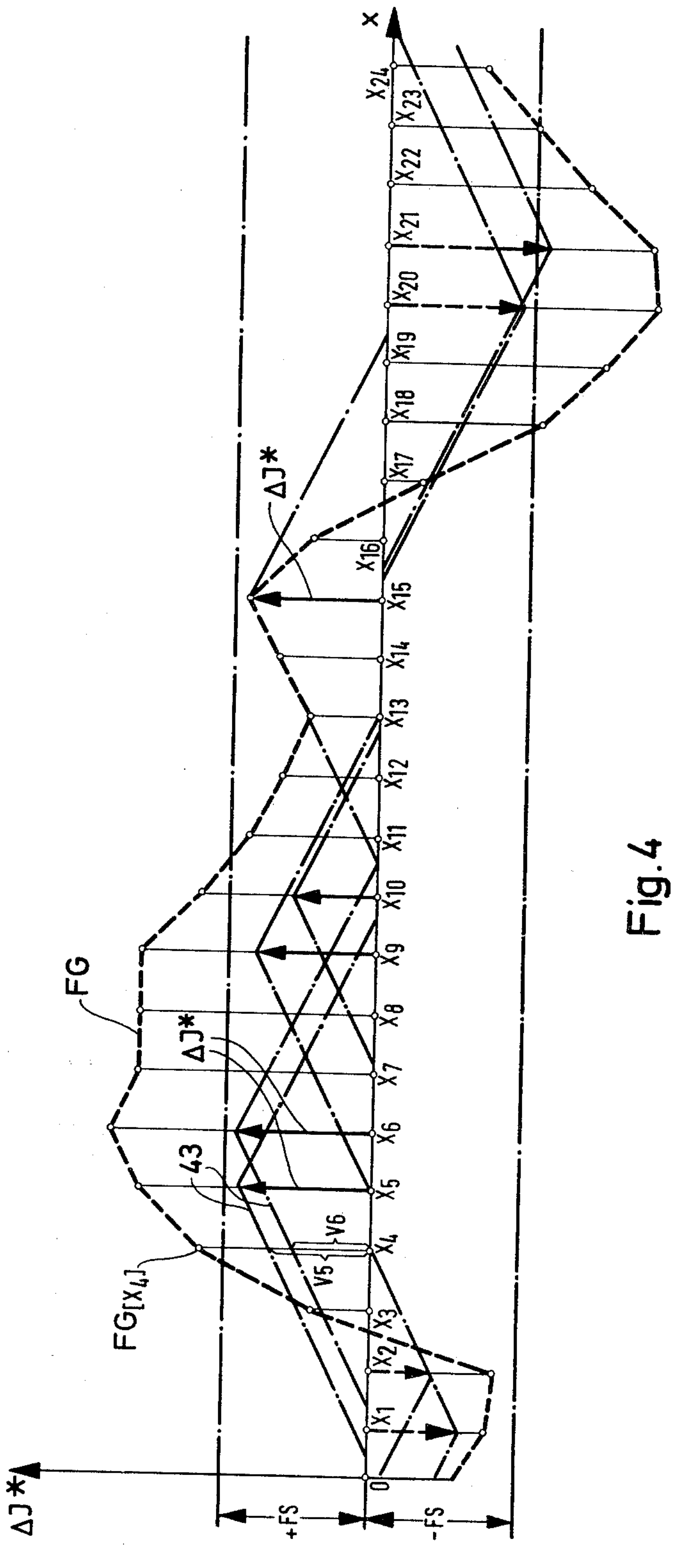
Figure 5:
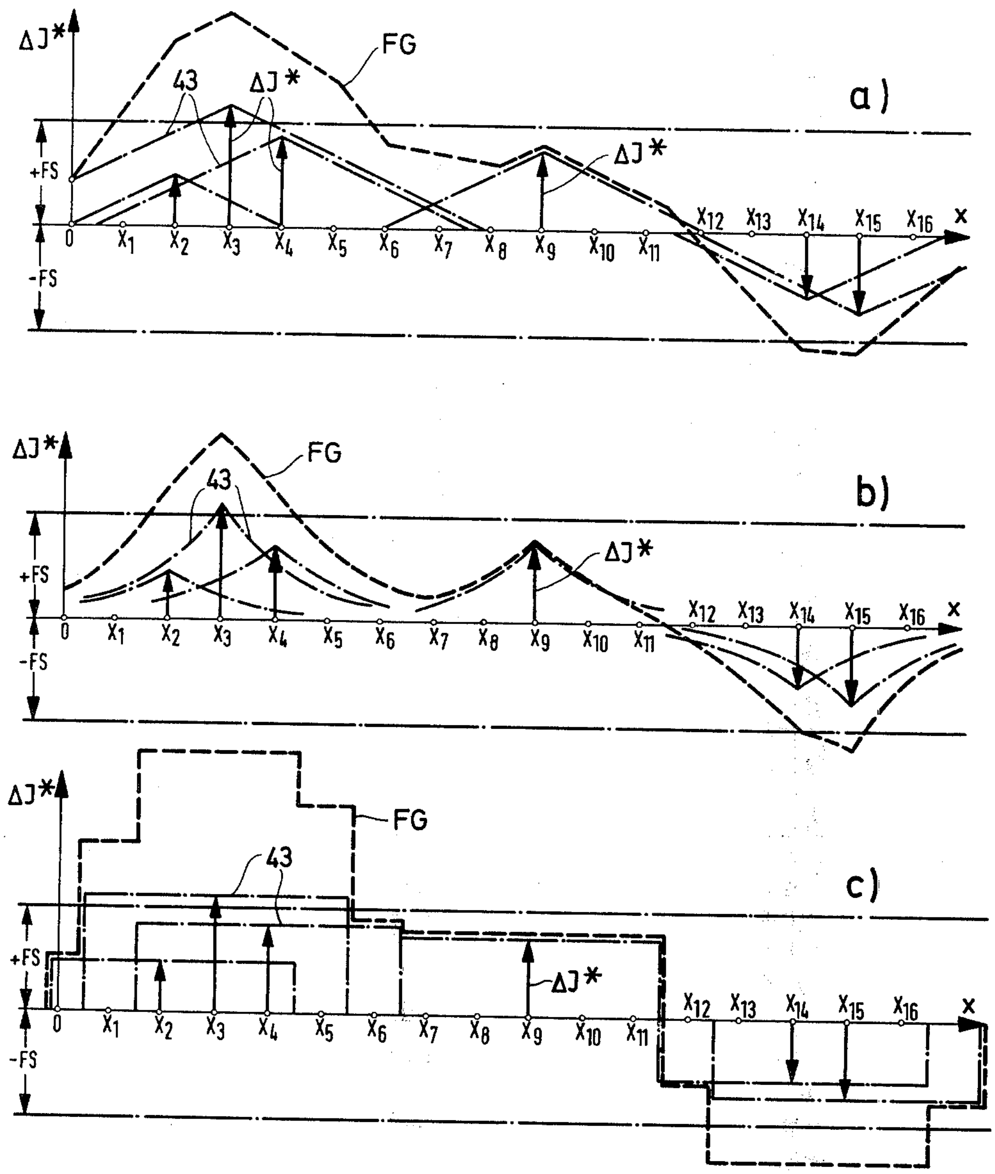

FIG. 4 is a section of the corrected differential values $\Delta I^*$ of the fault hills associated with the individual image points $X_1 \ldots X_{23}$. The contour lines of the fault hills have been given reference 44. Superimposition of the individual fault hills gives the fault mountain having the reference FG. The superimposition in respect of the image point $X_4$ is shown explicity as an example. The height of the fault mountain at this image point is the sum of the heights $V_5$ and $V_6$ of the fault hills associated with the image points $X_5$ and $X_6$.

The breadth effect of the differential values $\Delta I^*$ will be clear. The height of the fault mountain is dependent not only on the magnitude of the differential values but also on whether there are other differential values in the surroundings. Thus both the contrast of the fault (I) and its area (number of image points) are jointly taken into account in the evaluation.

To form the fault decision there now needs to be just one predetermined fault threshold $\pm$FS and investigation as to whether the fault mountain, i.e. the absolute amounts of the added differential values at each image point, does or does not exceed the fault threshold FS. If the fault threshold is exceeded the sample is evaluated as faulty. The magnitude of the fault threshold must of course be determined empirically, and depends on what is to be assessed as a fault or not.

Apart from the conical forms, any other forms of fault hills or weight functions are possible in principle. FIGS. *6b* to *6f* show a small selection. The fault hills may have rotation-symmetry or pyramid-symmetry or even be block-shaped. The base surfaces may have a diameter or side length of about 4–20, preferably 8–12, times the distance between two text points. This corresponds to a breadth effect on surrounding points up to the maximum distance of about 2–10 to 4–6 text point distances. The weight function may fall off linearly (FIG. *6a,b*) or exponentially (FIG. *6c,d*) or be constant over the entire base area (FIG. *6e,f*).

FIGS. *5a–c* show the influence of different fault hill forms on the shape of the resulting fault contain for one and the same differential field, of which only one line is shown in each case with the text points $X_1 \ldots X_{16}$. FIG. *5a* shows a fault mountain based on regularly pyramidal fault hills as shown in FIG. *6b*. FIG. *5b* is broad on pyramidal fault hills with exponentially curved side surfaces as shown in FIG. *6b*, and FIG. *5c* is based on a fault mountain consisting of a superimposition of block-shaped fault hills as shown in FIG. *6f*.

The block-shaped fault hill is the most favourable for practical performance of the evaluation in the fault computer. However, with this form of fault hill the minimum threshold correction is absolutely necessary, because otherwise even relatively small errors would rapidly be summated to give sum values above the fault threshold, because of the considerable breadth effect.

FIGS. 7 and 8 illustrate a working example of an error computer suitable for carrying out the above described method of error assessment on the basis of a rectangular fault hill.

The error computer 4 comprises a demultiplexer 104 and four arithmetic units 105, each of which has the same construction. The demultiplexer 104 distributes the differential values, which are fed serially to it from the comparison stage 4, groupwise amoung the individual arithmetic units 105. The essence of this is that the individual scanning lines are subdivided into four sections, that is to say, the entire surface of the bank-note is subdivided into four scanning zones. The differential values obtained from the individual scanning zones are then processed separately by each of the arithmetic units 105.

If the scanning devices 1 and 2 and the comparator 3 are so arranged that they effect the subdivision of the surface of the bank-note by themselves (for example by means of four partial scanning systems arranged in parallel, such as four rectilinear photodiode arrays), for example as the scanning devices described in the above mentioned U.S. patent application Ser. Nos. 790,606 of Apr. 25, 1977 and 791,140 of Apr. 26, 1977, (corresponding to Swiss patent application Nos. 5449/76 and 5450/76 respectively), do, then it will be understood that the demultiplexer 104 can be omitted.

Each arithmetic unit comprises eight first shift registers 201, eight second shift registers 202, two adders 203 and 204, a divider 205, a subtractor 206, a suppressor 207, and two comparators 208 and 209.

The length of the shift registers defines the length of a scanning line section, i.e. the width of a scanning zone. In the present case, the shift registers have a capacity of 256 bytes, so that a scanning line section comprises 256 scanning points.

The first and second shift registers are each connected in series to one another. A group of eight shift registers thus represents a scanning field of 256 $\times$ 8 scanning points. The first of the first eight shift registers 201 receives at its entry 201*a* the differential values $\Delta I$ transmitted serially from the demultiplexer 104. These differential values are also fed to the adder 203 and there added up. The adder 203 is also connected to the exit 201*b* of the last of the eight shift registers 201 and subtracts the differential value always occurring at this exit from the differential values which have been added up. In this way, the sum of the differential values obtained from a scanning field comprising 256 $\times$ 8 scanning points is on each occasion at the exit 203*a* of the adder 203. The divider 205 then divides this sum by 256 $\times$ 8 = 2048 and thus forms the average value $M_{\Delta I}$ from the differential values $\Delta I$ of the respective scanning field.

The comparator 208 compares this average value with an adjustable shading (or tone) threshold value TS and produces at its exit 208*a* a first error signal $F_1$, if the average value exceeds the shading threshold value.

The average value $M_{\Delta I}$ is then subtracted from each individual differential value $\Delta I$ by means of the subtractor 206 and the above described shading correction thereby effected. The shading corrected differential values $\Delta I - M_{\Delta I}$ are then compared in the suppressor 207 for their absolute amount with a minimum threshold value MS and rated zero if they do not attain this minimum threshold value MS. This can be accomplished for example in such a way that all those values whose four most significant bits for example are zero, are rated zero. All differential values whose shading has been corrected and which exceed the minimum threshold value MS pass through the suppressor 207 unchanged. Thus the differential value ΔI* whose minimum threshold value has been corrected are present at the exit 207*a* of the suppressor 207.

These corrected differential values ΔI* then pass through the second eight shift registers 202. The serial entrances 202*a* of the shift registers 202 are connected to the second adder 204, which adds up continuously the differential values ΔI* which are present at these entrances. Simultaneously, the exits 202*b* of the shift registers 202, which are displaced by eight positions vis-à-vis the entrances 202*a*, are connected to the adder 204. The differential values ΔI present at these exits are continuously substracted in the adder from the values which have been added up. As in the first adder 203, addition and subtraction are indicated by the symbols ⊞ and ⊟. The sum of the differential values ΔI* obtained from a scanning area of 8 × 8 scanning points are thus constantly formed at the exit of the adder 204. In accordance with the method of evaluation described above, the adder 204 therefore forms a fault mountain on the basis of rectangular fault hills having a basic area of 8 × 8 scanning points.

The sum formed by the adder 204 is then compared in the comparator 209 with a given reference value and, if this latter is exceeded, a second error signal $F_2$ is produced at the exit 209*a*.

The realisation of fault hills which are other than rectangular is somewhat more complicated, but can nonetheless be accomplished without difficulty. In principle, the adder 204 need only be replaced by a parallel adder having 64 imputs, which are then connected to each of the first eight exits of the second eight shift registers via suitably dimensioned attenuators. It is within the skill of the expert to create such a circuit and therefore no further detailed explanation is deemed necessary.

Although the invention has been described above only in connection with the quality control of printed products, more particularly bank-notes, the method according to the invention is of course correspondingly applicable to other information supports. e.g. magnetic cards or the like.

What is claimed is:

1. A method of assessing a printed product by point-wise comparison of the sample under assessment with an original, comprising:

scanning said sample and said original to obtain reflectance values from each individual image point of the sample and the original;

forming differential values between the reflectance values of corresponding image points of the sample and the original;

adding, with the predetermined weighting, to the differential value of each image point the differential values of the image points adjacent to the respective image point to obtain added differential values for each image point;

comparing said added differential values with a predetermined threshold; and, assessing the sample as faulty if the absolute amount of said added differential values exceeds said threshold at least in one image point.

2. A method according to claim 1 comprising:

forming a separate mean value for each image point from the differential values of the respective image point and predetermined image points surrounding the same;

subtracting said separate mean value from the differential value of the respective image point; and obtaining said added differential values by weighted addition of the differential values reduced by said separate mean value.

3. A method according to claim 2 comprising comparing said mean values with a predetermined shade threshold value and assessing the sample as faulty if the absolute amount of at least one mean value exceeds said shade threshold value.

4. A method according to claim 1 wherein the weighting is selected according to the distance between the respective image point and the image points adjacent said respective image point.

5. A method according to claim 4 wherein the weighting is selected to decrease linearly.

6. A method according to claim 4 wherein the weighting is selected to decrease exponentially.

7. A method according to claim 4 wherein the weighting is selected to be constant up to a predetermined distance, and equal to zero beyond such distance.

8. A method according to claim 4 wherein the weighting is selected to be rotation-symmetrical.

9. A method according to claim 4 wherein the weighting is selected to be pyramid-symmetrical.

10. A method according to claim 7 wherein the weighting is selected to be block-symmetrical.

11. A method according to claim 4 wherein the weighting is selected to decrease to zero in such manner as to reach the value zero at a distance of 2–10, image points from the image point concerned.

12. A method according to claim 1 wherein prior to weighted addition of the differential values, a mean is formed from the differential values at the individual image points, said mean is subtracted from the individual differential values, and only the differential values reduced by the mean value in this way are added with weighting.

13. A method according to claim 2 wherein the surrounding points are each selected to the situated within a surrounding zone whose area is 0.5% to 10% of the total original area of the sample.

14. A method according to claim 1 wherein the comparison of the sample and the original is carried out separately for individual primary colours.

15. A method of assessing a printed product by point-wise comparison of the sample under assessment with an orignal, comprising:

scanning said sample and said original to obtain reflectance values from each individual image point of the sample and the original;

forming differential values between the reflectance values of corresponding image points of the sample and the original;

comparing the differential values with a minimum threshold and selecting only those differential values whose absolute amounts are not less than said minimum threshold, adding, with predetermined weighting, to the selected differential value of each image point the selected differential values of the image points adjacent to the respective image point to obtain added differential values for each image point;

comparing said added differential values with a predetermined threshold; and assessing the sample as faulty if the absolute amount of said added differential values exceeds said threshold at least in one image point.

16. A method according to claim 15 comprising comparing said sample and said original separately for individual primary colours and thereby selecting the minimum threshold value in dependence of the respective primary colour.

17. A method according to claim 15 wherein the minimum threshold value is selected to depend, for each image point, on its geometric position on the sample or the original.

18. A method according to claim 15 wherein the minimum threshold is so selected that its ratio to the maximum expected reflectance of an image point is at least approximately equal to the ratio between the area values of the smallest fault spot for detection having a high contrast to its surroundings, and the area of an image point.

19. A method of assessing a printed product by pointwise comparison of the sample under assessment with an original, comprising:

scanning said sample and said original to obtain reflectance values from each individual image point of the sample and the original;

forming differential values between the reflectance values of corresponding image points of the sample and the original;

forming a separate mean value for each image point from the differential values of the respective image point and predetermined image points surrounding the same;

subtracting said separate mean value from the differential value of the respective image point to obtain reduced differential values;

comparing the reduced values with a minimum threshold and selecting only those reduced values whose absolute amounts are not less than said minimum threshold;

adding, with predetermined weighting, to the selected reduced differential value of each image point the selected reduced differential values of the image points adjacent to the respective image point to obtain added differential values for each image point;

comparing said added differential values with a predetermined threshold; and assessing the sample as faulty if the absolute amount of said added differential values exceeds said threshold at least in one image point.

* * * * *